(12) United States Patent
James et al.

(10) Patent No.: US 6,208,645 B1
(45) Date of Patent: Mar. 27, 2001

(54) TIME MULTIPLEXING OF CYCLIC REDUNDANCY FUNCTIONS IN POINT-TO-POINT RINGLET-BASED COMPUTER SYSTEMS

(75) Inventors: David V. James, Palo Alto; Glen D. Stone, San Jose, both of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/084,883

(22) Filed: May 28, 1998

Related U.S. Application Data

(60) Provisional application No. 60/048,353, filed on May 30, 1997.

(51) Int. Cl.[7] .................................................. H04J 3/14
(52) U.S. Cl. ........................................ 370/389; 714/758
(58) Field of Search .............................. 714/6, 758, 52, 714/708; 370/389, 395, 471, 474, 253

(56) References Cited

U.S. PATENT DOCUMENTS

| | | | |
|---|---|---|---|
| 5,467,341 | * 11/1995 | Matsukame | 370/253 |
| 5,553,067 | * 9/1996 | Walker et al. . | |
| 5,881,063 | * 3/1999 | Bement et al. | 370/389 |
| 5,914,752 | * 6/1999 | Mollett et al. | 359/137 |
| 6,064,672 | * 5/2000 | Van Loo et al. | 370/389 |
| 6,088,337 | * 7/2000 | Eastmond et al. | 370/280 |

* cited by examiner

*Primary Examiner*—Douglas W. Olms
*Assistant Examiner*—Ken Vanderpuye
(74) *Attorney, Agent, or Firm*—Burns, Doane, Swecker & Mathis, L.L.P.

(57) ABSTRACT

A method and system for providing cyclic redundancy check (CRC) functions within a ringlet-type interconnect of a computer system are described. By time multiplexing CRC checking and generating functions, the number of CRC units can be reduced.

4 Claims, 4 Drawing Sheets

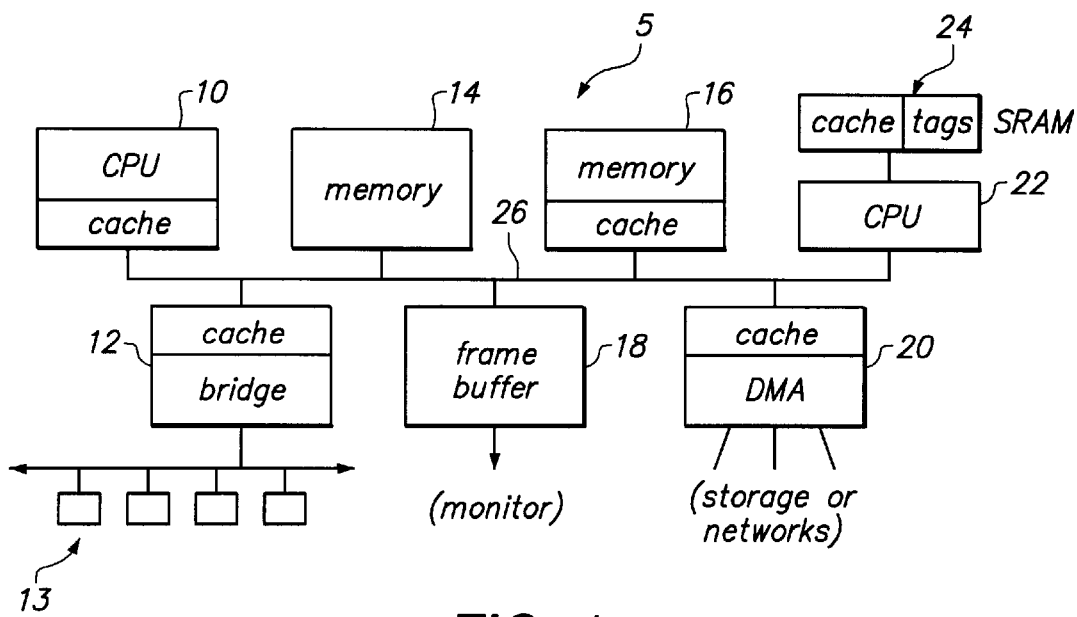
FIG. 1
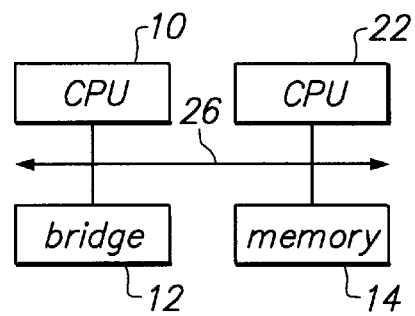
FIG. 2(a)
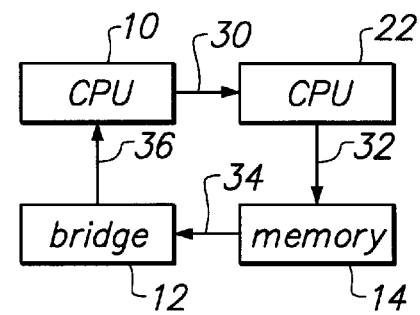
FIG. 2(b)
| TARGET ID | OLD BIT | COMMAND | SOURCE ID | PAYLOAD DATA | CRC |
|-----------|---------|---------|-----------|--------------|-----|
FIG. 2(c)

TIME MULTIPLEXING OF CYCLIC REDUNDANCY FUNCTIONS IN POINT-TO-POINT RINGLET-BASED COMPUTER SYSTEMS

CROSS REFERENCE TO RELATED APPLICATION

This application claims the benefit of Provisional Application No. 60/048,353, filed May 30, 1997.

BACKGROUND

The present invention relates generally to multiprocessor systems and, more particularly, to systems and techniques for efficiently checking and generating cyclic redundancy functions in such systems.

As the performance demands on personal computers continue to increase at a meteoric pace, processors have been developed which operate at higher and higher clock speeds. The instruction sets used to control these processors have been pared down (e.g., RISC architecture) to make them more efficient. Processor improvements alone, however, are insufficient to provide the greater bandwidth required by computer users. The other computer subsystems which support the processor, e.g., interconnects, I/O devices and memory devices, must also be designed to operate at higher speeds and support greater bandwidth. In addition to improved performance, cost has always been an issue with computer users. Thus, system designers are faced with the dual challenges of improving performance while remaining competitive on a cost basis.

Early personal computers typically included a central processing unit (CPU), some type of memory and one or more input/output (I/O) devices. These elements were interconnected to share information using what is commonly referred to as a "bus". Physically, buses are fabricated as a common set of wires to which inputs and outputs of several devices are directly connected.

Buses convey data and instructions between the elements of a digital computer. Local buses provide data transmission capability within a device, whereas system buses interconnect devices, such as I/O subsystems, memory subsystems and a central processor, together. In many systems, several devices compete for use of the system bus. In industry parlance, devices which can control the system bus are termed bus masters, while other devices, which are passive and respond to requests from the bus masters, are termed slaves. Some devices may operate at different times either as a slave or a bus master to accomplish different objectives.

The advent of multiprocessor architectures for personal computers is a recent trend in the design of these systems, intended to satisfy consumers' demand for ever faster and more powerful personal computers. In a typical multiprocessor computer system each of the processors may share one or more resources. Note, for example, the multiprocessor system depicted in FIG. 1. Therein, an exemplary multiprocessor system 5 is illustrated having seven nodes including a first CPU 10, a bridge 12 for connecting the system 5 to other I/O devices 13, first and second memory devices 14 and 16, a frame buffer 18 for supplying information to a monitor, a direct memory access (DMA) device 20 for communicating with a storage device or a network and a second CPU 22 having an SRAM device 24 connected thereto. According to the conventional paradigm, these nodes would be interconnected by a bus 26. Caches can be provided as shown to isolate some of the devices from the bus and to merge plural, small bus accesses into larger, cache-line sized accesses.

As multiprocessor systems grow more complex, i.e., are designed with more and more nodes, adapting the bus-type interconnect to handle the increased complexity becomes problematic. For example, capacitive loading associated with the conductive traces on the motherboard which form the bus becomes a limiting factor with respect to the speed at which the bus can be driven. Thus, an alternative interconnect architecture is desirable.

One type of proposed interconnect architecture for multiprocessor personal computer systems replaces the bus with a plurality of unidirectional point-to-point links and uses packet data techniques to transfer information. FIGS. 2(a) and 2(b) conceptualize the difference. Ringlets overcome the aforementioned drawback of conventional bus-type interconnects since their individual links can be clocked at high speeds regardless of the total number of nodes which are linked together. FIG. 2(a) depicts four of the nodes from FIG. 1 interconnected via a conventional bus. FIG. 2(b) illustrates the same four nodes interconnected via unidirectional point-to-point links 30, 32, 34 and 36. These links can be used to provide bus-like functionality by connecting the links into a ring (which structure is sometimes referred to herein as a "ringlet") and having each node pass-through packets addressed to other nodes. As will be appreciated by those skilled in the art, packets are formatted to include payload data as well as various overhead information including, for example, information associated with the target and source nodes' addresses.

An exemplary packet format is illustrated in FIG. 2(c). Therein, the packet includes a target node identification field (Target ID), an old bit field, a command field, a source node identification field (Source ID), payload data and a cyclic redundancy check (CRC) field. Between the data packets, the system circulates filler data referred to herein as out-of-band information or idle symbols.

CRC techniques are well known to those skilled in the art for use in detecting errors in transmitted data. Upon creation of a packet at a node, a CRC generator take the message block, e.g., all of the fields illustrated in FIG. 2(c) except for the CRC field, and divide the block by some predetermined binary number. The resulting quotient forms one or more check characters, which are then appended as the CRC field. Upon receipt of the packet at another node, a CRC checking function can perform the same operation and compare the resulting quotient to the value of the appended CRC field to determine if any transmission errors have corrupted the packet.

As seen in FIG. 2(d), each node in a ringlet (e.g., CPU 10) can be conceptualized as having strip component 38 for receiving incoming packets and send component 39 for handling the transmission of packets. Both the strip and send components require CRC hardware for checking CRCs on received packets and generating CRCs on transmitted packets. In fact, traditional design techniques would provide four CRC hardware units for each node, i.e., one unit in each of the strip and send components to check CRCs and one unit in each of the strip and send components to generate CRCs.

However, CRC checking/generating hardware is relatively expensive and requires a large number of gates. Currently, 32 bit CRC fields are typically used in these types of applications to provide error checking, however, it is likely that as the processing power of computing systems increases, so will the packet size and the size of the CRC fields. Accordingly, it would be desirable to have a more efficient scheme for handling CRC checking/generation that reduces the amount of hardware required for this functionality in each node.

SUMMARY

According to exemplary embodiments of the present invention, a reduction in CRC hardware can be achieved by time multiplexing various CRC checking/generating functions to be performed within a node. For example, by taking advantage of the idle symbols which follow received packets in some systems, the checking of the CRC field of incoming packets can be performed during a first time period, while the generation of the CRC field of an acknowledgement packet for that received packet can be performed during a second, subsequent time period using the same CRC hardware.

According to another exemplary embodiment of the present invention, CRC hardware can be further reduced by creating a half duplex node which selectively handles either packets that have been received or packets to be transmitted. By delaying the stripping of packets incoming to the node, the same CRC hardware can be used both for receive packet CRC checking and transmit packet CRC generation.

BRIEF DESCRIPTION OF THE DRAWINGS

The foregoing, and other, objects, features and advantages of the present invention will be more readily understood upon reading the following detailed description in conjunction with the drawings in which:

FIG. 1 is a block diagram of an exemplary multiprocessor system;

FIGS. 2(a) and 2(b) are block diagrams of multinode systems which conceptually illustrate the difference between bus-type interconnects and ringlet-type interconnects;

FIG. 2(c) depicts an exemplary packet format;

DETAILED DESCRIPTION

To provide some context within which to describe exemplary CRC checking and generating systems and techniques according to the present invention, an illustrative ringlet operation will now be described with respect to FIGS. 3(a)–5(b). To simplify the following discussions, the exemplary multiprocessor system of FIG. 3(a) has only three nodes, CPU 40 connected to CPU 42 which is connected to memory 44, which is in turn connected back to CPU 40 by unidirectional point-to-point links. Of course those skilled in the art will appreciate that the present invention is applicable to systems having any number of nodes.

Figure 3A:
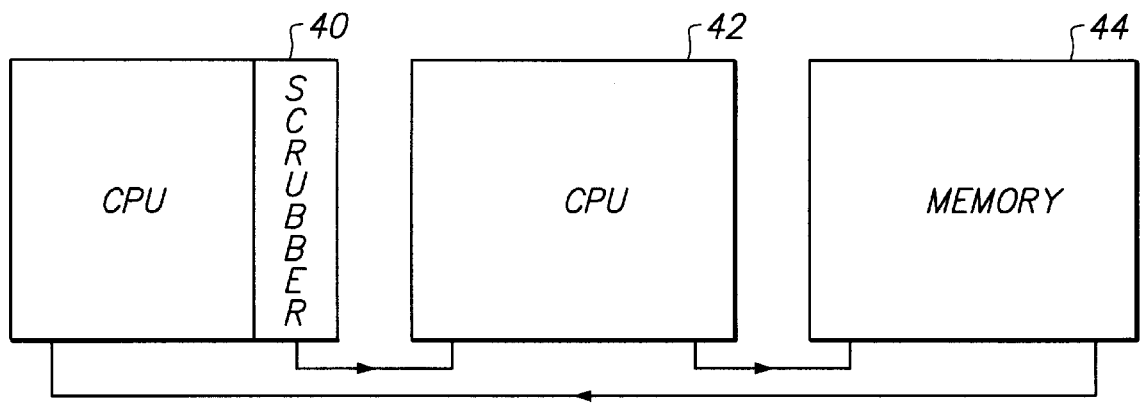
FIG. 3(a) is a block diagram illustrating an exemplary three node ringlet.

In the system of FIG. 3(a), request and acknowledge packets are used to communicate between nodes. Request packets transfer address and commands (and for writes, data); response packets return status (and for reads, data). Request and response packets travel between nodes referred to as producer and consumer, with intervening nodes simply forwarding packets without modification.

For example, suppose that CPU 40 (the producer) creates a request or response packet, addressed to memory 44 (the consumer), and sends the packet over its outgoing point-to-point link. CPU 42 receives the packet and, recognizing that it is not the intended recipient, forwards the packet over its outgoing point-to-point link. Memory 44 (the consumer) recognizes and removes the packet and sends an acknowledge packet addressed to CPU 40 to confirm successful reception of the packet.

Figure 2D:
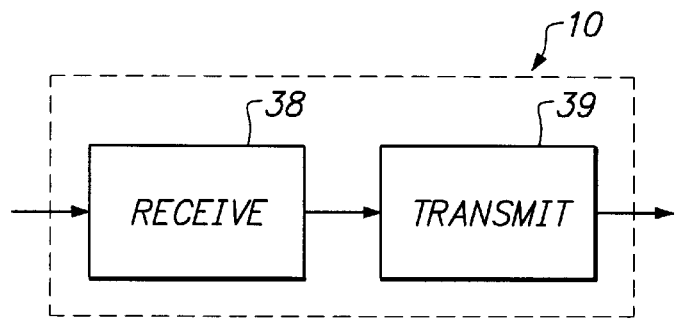
FIG. 2(d) is a block diagram at a conceptual level of a node in a ringlet.

CPU 40 also has a scrubber associated therewith that performs a variety of ringlet maintenance functions, e.g., removing incorrectly addressed packets from ringlet circulation. For example, a packet may have a non-existent node address in its address field due to transmission errors or simply being misaddressed at creation. As packets pass through the scrubber, the old bit field (see FIG. 2(c)) is changed from 0 to 1. If a packet circulates through the ring again and returns to the scrubber having its old bit field set equal to 1, the scrubber removes it so that misaddressed packets do not continue to circulate through the ringlet.

Scrubbers also operate on idle symbols to control the rate of packet retransmission. Idle symbols are sent between data packets and can be used, for example, to measure ringlet circulation time. Idle symbols can also be used by the nodes to detect and compensate for gradual changes in node-to-node delays between packet transmissions. Moreover, according to exemplary embodiments of the present invention, the fact that idle symbols are transmitted between data packets allows for time multiplexing of CRC hardware as described below.

Figure 3B:
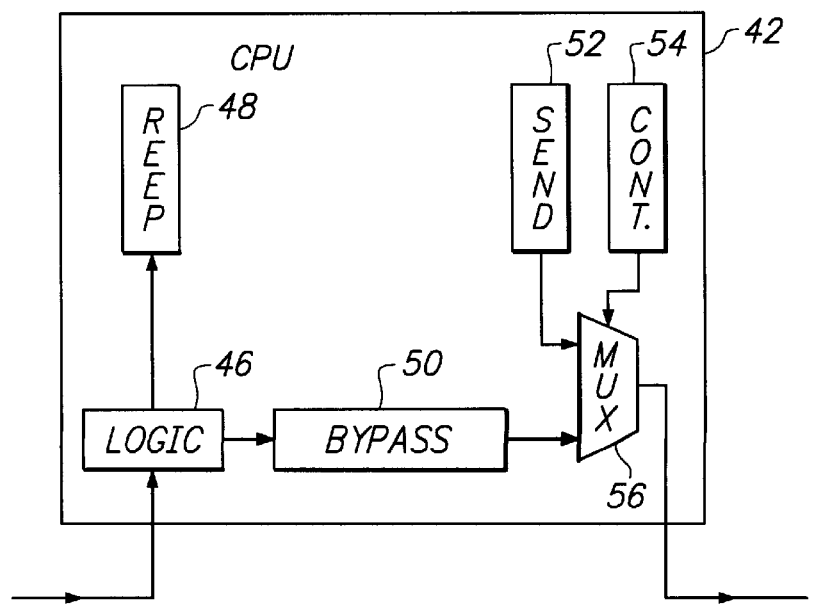
FIG. 3(b) illustrates one node of FIG. 3(a) in greater detail.

Each of the nodes may also contain at least three queues (e.g., first-in-first-out (FIFO) units) for buffering packets as needed. This aspect of systems according to exemplary embodiments of the present invention is seen in FIG. 3(b), wherein node 42 is shown in more detail. The target ID of an incoming packet is evaluated by logic 46 to determine if node 42 is the intended recipient thereof. If so, the packet is forwarded to strip FIFO 48 for processing within node 42. Otherwise, if the packet is passing-through, it is forwarded to bypass FIFO 50 for buffering until transmission bandwidth is available on node 42's outgoing point-to-point link. Packets which are created by node 42 for transmission are buffered in sending FIFO 52. Controller 54 determines which of FIFOs 50 and 52 can -use the outgoing link by providing the select input to multiplexor 56.

As mentioned above, receive logic 46 needs to have the capability to both check the CRC on incoming packets and generate a CRC for acknowledge packets which it creates. One configuration (whether implemented as hardware or software) for handling these CRC functions is illustrated as FIG. 4(a). Therein, an incoming packet arrives at the "inputs" node and has its CRC field stripped off and provided to CRCa unit 62 for error checking. At the same time, control unit 64 evaluates the content of the packet, e.g., the targetID field, to determine whether the packet is intended for reception by this node and provides appropriate multiplexor select control signals as described below. If CRCa unit 62 determines that the CRC is good and if control unit 64 identifies the packet as intended for this node, then the packet is stored in the strip FIFO 48. If, however, the CRC check is invalid, i.e., the determined quotient doesn't match the value of the received CRC field, then CRCa outputs a distinct "stomp" value to CRCb unit 66.

While this error checking is being performed, the packet is also passed to parse unit 68. Acknowledge/Parse unit 68 parses the received data packet to create the data portion of an acknowledge packet which will be forwarded by receive logic 46 if the received packet is kept by this node. Thus, based upon system timing and the control unit 64's determination of whether the received packet is intended for this node or simply passing through, control unit 64 will send an appropriate select signal on line 70 to multiplexor 72 which will allow either an acknowledge packet, the received (passing-through packet) or idle symbols to be presented to multiplexor 74 for transmission.

Once control unit 64 has gated this portion of either an acknowledge or a passing-through packet through multiplexor 74, it will then append a new CRC field thereto using CRCb unit 66. If CRCa unit 62 has output a "stomp" value, i.e., indicating that the received packet failed its CRC check, then CRCb 66 will output an invalid CRC value so that the outgoing packet, whether it is an acknowledge packet or a passing-through packet, will be recognized as invalid by the next downstream node. If, however, CRCa unit 62 did not output a "stomp" value, then CRCb will generate a valid CRC field using the data input from multiplexor 72, which CRC field will be gated through multiplexor 74 and appended to the rest of the packet for transmission.

Figure 4A:
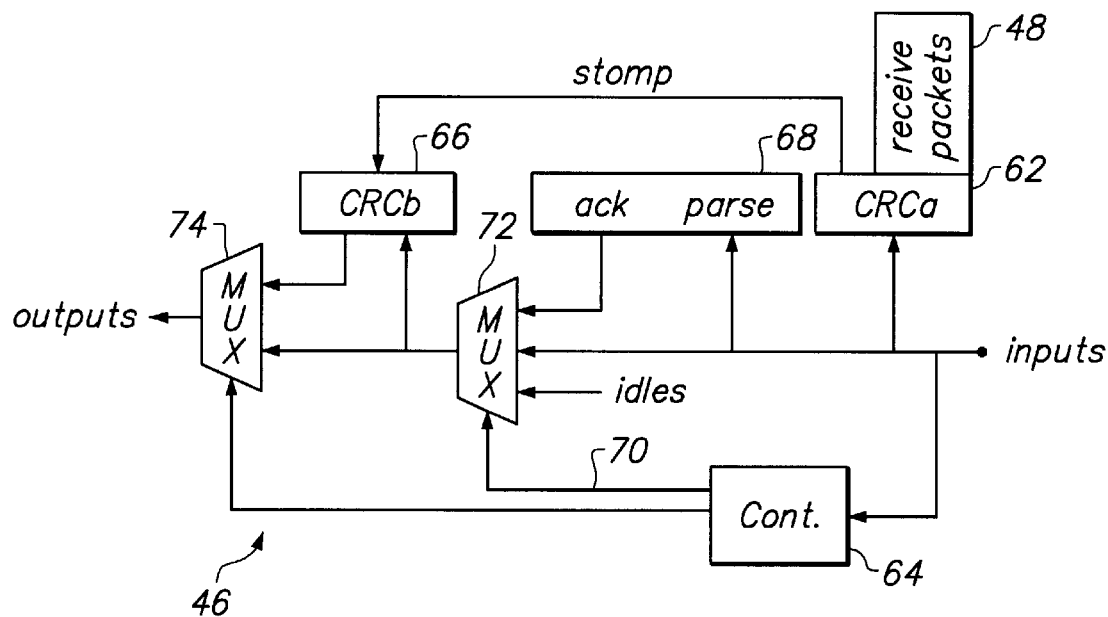
FIG. 4(a) illustrates conventional receive logic processing which includes performing CRC checking/generating.
Figure 4B:
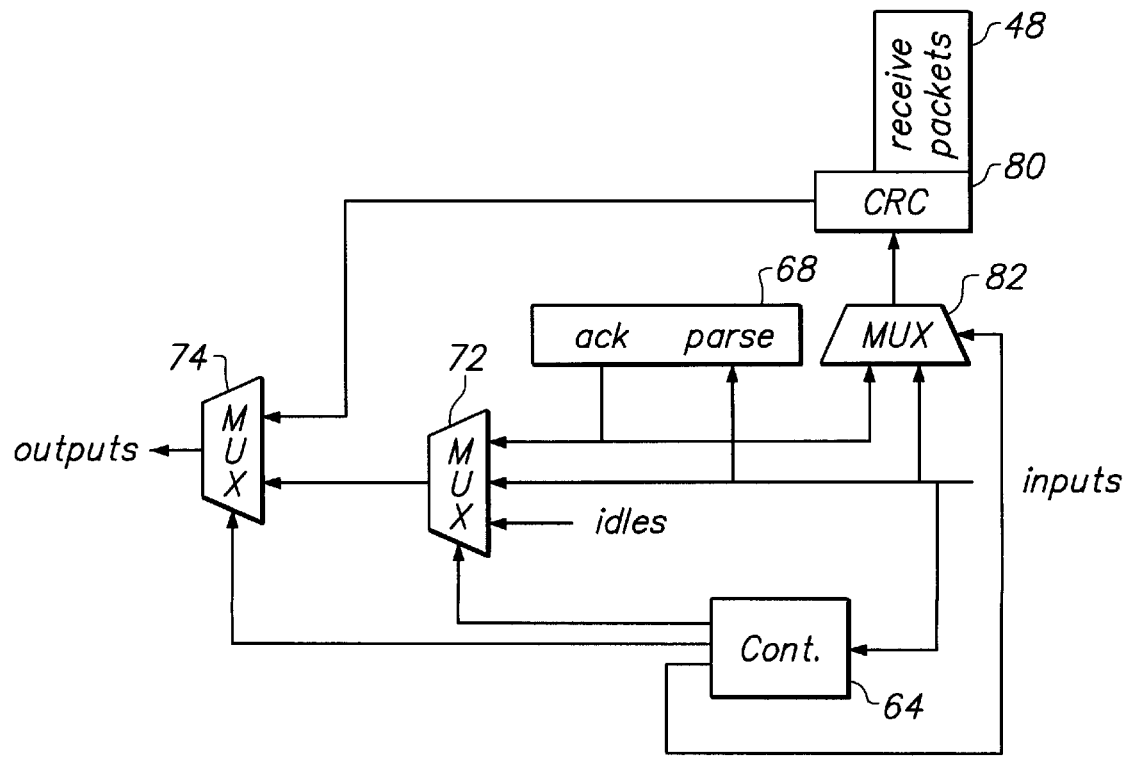
FIG. 4(b) illustrates an exemplary receive logic processing unit according to the present invention having a reduced number of CRC units.
Figure 4C:
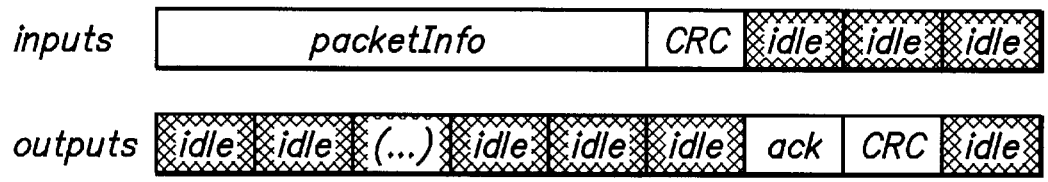
FIG. 4(c) depicts an exemplary timing diagram for inputs and outputs for the processing unit of FIG. 4(b)
Figure 5:
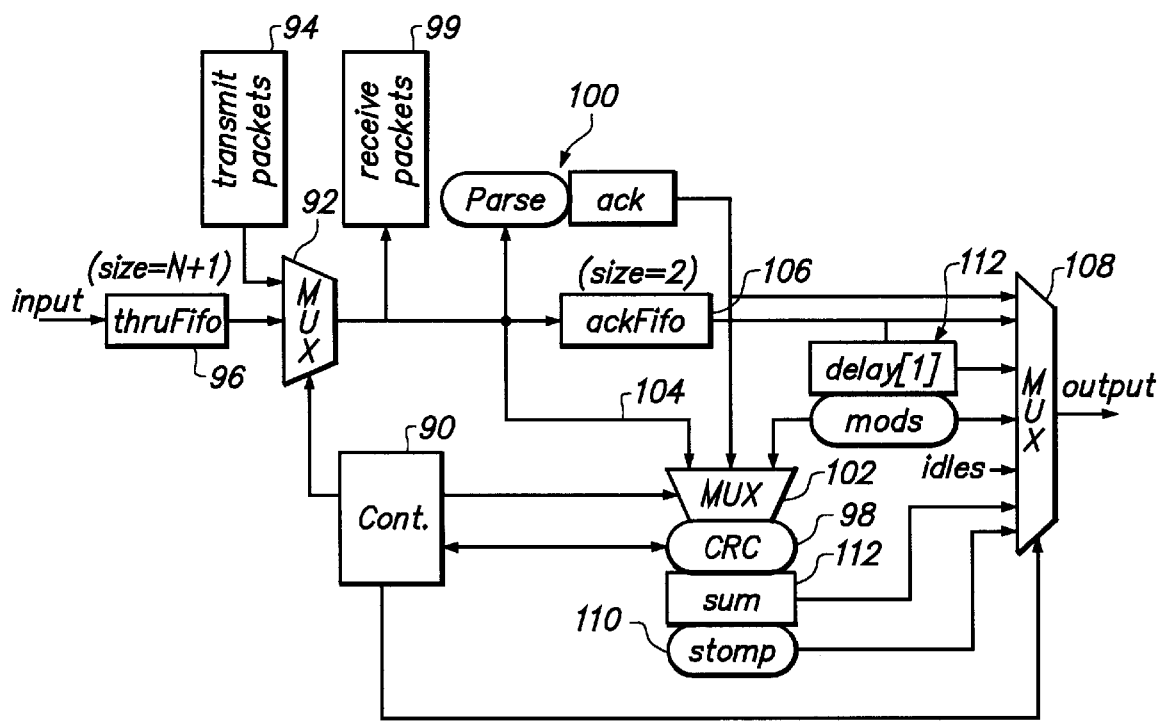
FIG. 5 illustrates a combined transmit/receive node according to the present invention.

The drawback of the configuration illustrated in FIG. 4(*a*) is that it uses two CRC units to perform CRC checking and generation independently. Since the same algorithms are used for both CRC checking and generation, Applicants have recognized that it would be desirable to time multiplex these functions and re-use the same hardware to perform both CRC checking and generation to reduce the cost and complexity of each node.

A solution to this drawback according to an exemplary embodiment of the present invention is illustrated in FIG. 4(*b*). Therein, like reference numerals are used to identify similar components described above with respect to FIG. 4(*a*). Using the fact that incoming packets are followed by an idle symbol, the acknowledge packet can be output during this idle period whereupon a CRC filed can be created for the outgoing packet. This timing is illustrated in FIG. 4(*c*). Thus, the hardware in FIG. 4(*b*) can be simplified relative to FIG. 4(*a*) by combining CRCa 62 and CRCb 66 into a single CRC checking/generating unit 80. This CRC checking/generating unit 80 will selectively receive either an incoming packet or an acknowledge packet from multiplexor 82 under the control of control unit 64 which will adjust its select control signal based upon the known system timing, e.g., that illustrated in FIG. 4(*c*).

The foregoing exemplary embodiment reduces the number of CRC units in half, e.g., from four to two (one each for the receive and transmit components). However, according to another exemplary embodiment illustrated in FIG. 5, it is possible to use a single CRC checking/generating unit for both the receive and transmit components in a half-duplex design, i.e., which restricts concurrent transmit/receive bandwidth characteristics. Therein, control unit 90 controls multiplexor 92 to select either packets to be transmitted by the node from buffer 94 or received packets from buffer 96 for further processing. By delaying the stripping of incoming receive packets in buffer 96, the same CRC logic 98 can be used for receive packet CRC checking and transmit packet CRC generation. As in the earlier described embodiments, receive packets addressed to this node are sent to strip buffer 99 for further processing within the node.

The packet is parsed and prepared for selective acknowledgement in unit 100 as described above, so that control unit 90 can send an acknowledge packet when needed. The output of the acknowledge/parse unit 100 is provided as one input to multiplexor 102 for selective CRC generation under the control of control unit 90. Similarly, passing through and transmit packets are provided as a second input to multiplexor 102 for CRC checking/generation. Ack FIFO 106 delays the presentation of packets to the output multiplexor 108 to preserve system timing relationships.

Given its knowledge of the timing cycle of packets, e.g., FIG. 4(*c*), control unit 90 selectively gates in a packet via multiplexor 92 and then, based in part on the type of packet and its contents, selects which input is provided to CRC algorithm 98 to provide the desired function, i.e., CRC checking or generation. If an invalid CRC is detected by CRC algorithm 98, then stomp unit 110 provides an invalid CRC value to multiplexor 108. Otherwise, the valid checksum is output from sum unit 112 to multiplexor 108.

In some situations, packets may need to be modified as they pass-through the node. These packets, referred to as "fly-by" packets, are handled by the delay/mods blocks 112. In order to modify the last information symbol in the packet header, the fly-by packet is delayed by one symbol prior to modification. Again, this delay is provided to allow for proper time multiplexing of the CRC algorithm 98.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed:

1. A method for handling data packets in a computer system comprising the steps of:

receiving an incoming data packet;

evaluating a first CRC field associated with said incoming data packet using a CRC circuit;

conveting, by an acknowledgment/parsing unit, said incoming data packet into an acknowledge packet;

generating a second CRC field associated with said incoming data packet using said same CRC circuit, wherein the same CRC circuit receives either incoming data packet or the acknowledge packet from the output of a multiplexer; and transmitting said acknowledge package.

2. A node in a computer system for error processing of received data packets comprising:

an input for receiving a data packet including a first CRC field;

an acknowledge/parsing unit for creating and outputting an acknowledge packet based upon said received data packet;

a multiplexer having as a first input said output of said acknowledge/parsing unit and as a second input said received data packet, an output of said multiplexer being connected to a cyclic redundancy check unit; and the cyclic redundancy check unit for (a) evaluating said first CRC field during a first time period and (b) generating a second CRC field for an acknowledge packet during a second time period.

3. The node of claim 2, further comprising:

a control unit for selectively gating one of said first and second inputs of said multiplexer to said cyclic redundancy check unit based upon system timing.

4. A computer system for processing data packets at each of plurality of nodes, each node comprising:

an input for receiving a first data packet including a first CRC field and having a first output;

a transmit buffer for buffering a second data packet created by said node and having a second output;

a multiplexer having said first and second outputs as inputs thereto for selectably outputting one of said first and said second data packets;

a cyclic redundancy check unit for selectively evaluating said first CRC field and generating a second CRC field for said second data packet; and a control unit for controlling said multiplexer and cyclic redundancy check unit.

* * * * *